(12) United States Patent
Iwai

(10) Patent No.: US 7,818,997 B2
(45) Date of Patent: Oct. 26, 2010

(54) DIAGNOSTIC DEVICE AND METHOD FOR AN INTAKE AIR TEMPERATURE SENSOR OF AN INTERNAL COMBUSTION ENGINE

(75) Inventor: Atsushi Iwai, Minokamo (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 263 days.

(21) Appl. No.: 12/067,061

(22) PCT Filed: Jul. 3, 2007

(86) PCT No.: PCT/IB2007/001810

§ 371 (c)(1),
(2), (4) Date: Mar. 17, 2008

(87) PCT Pub. No.: WO2008/004081

PCT Pub. Date: Jan. 10, 2008

(65) Prior Publication Data

US 2009/0078033 A1    Mar. 26, 2009

(30) Foreign Application Priority Data

Jul. 5, 2006  (JP) ............................... 2006-185606

(51) Int. Cl.
*G01M 15/04* (2006.01)
(52) U.S. Cl. .................. 73/114.31; 73/114.77
(58) Field of Classification Search .............. 73/114.31, 73/114.32, 114.34, 114.77
See application file for complete search history.

(56) References Cited

U.S. PATENT DOCUMENTS

| 2006/0157001 A1* | 7/2006 | Rahman et al. | 123/41.15 |
| 2008/0163679 A1* | 7/2008 | Viel | 73/114.34 |
| 2008/0196487 A1* | 8/2008 | Suzuki | 73/114.34 |
| 2009/0138154 A1* | 5/2009 | Mc Lain et al. | 701/34 |
| 2009/0139317 A1* | 6/2009 | Deivasigamani | 73/114.31 |

FOREIGN PATENT DOCUMENTS

| DE | 103 29 039 B3 | 1/2005 |
| DE | 103 29 038 B3 | 2/2005 |
| JP | 9-303191 A | 11/1997 |
| JP | 10-61479 A | 3/1998 |
| JP | 2003-28000 A | 1/2003 |
| JP | 2003-286888 A | 10/2003 |
| WO | WO 2004/040104 A1 | 5/2004 |
| WO | WO 2005/119040 A1 | 12/2005 |

* cited by examiner

*Primary Examiner*—Eric S McCall
(74) *Attorney, Agent, or Firm*—Sughrue Mion, PLLC

(57) ABSTRACT

An abnormality diagnostic device diagnoses the presence/absence of abnormality of an intake air temperature sensor (21) on the basis of the magnitude of deviation between the lowest temperature of the intake air detected via the intake air temperature sensor (21) in a period from the startup of an internal combustion engine until the trend of change in the temperature of the air taken into the internal combustion engine becomes stable and a temperature detected via a water temperature sensor (22). If the decline in the temperature of the intake air detected via the intake air temperature sensor (21) within the aforementioned period is greater than or equal to a predetermined criterion value (IAT1), the abnormality diagnosis is suspended.

19 Claims, 9 Drawing Sheets

DIAGNOSTIC DEVICE AND METHOD FOR AN INTAKE AIR TEMPERATURE SENSOR OF AN INTERNAL COMBUSTION ENGINE

BACKGROUND OF THE INVENTION

1. Field of the Invention

The invention relates to an abnormality diagnostic device and an abnormality diagnostic method for an intake air temperature sensor for an internal combustion engine which diagnose the presence/absence of an abnormality regarding an intake air temperature sensor that detects the temperature of the intake air supplied to an intake pipe of an internal combustion engine that is mounted in a vehicle.

2. Description of the Related Art

In internal combustion engines for motor vehicles, the air-fuel ratio is controlled in order to make proper the output characteristic, the fuel economy characteristic, the emission characteristic, etc., under various conditions. In the air-fuel ratio control, the amount of filet injection for obtaining a proper air-fuel ratio is calculated on the basis of the rotation speed of the internal combustion engine and the amount of intake air. Although the intake air amount is always detected via an intake air amount sensor, the detected intake air amount does not always equal the actual volume thereof since intake air changes in density in accordance with the temperature. Therefore, the intake pipe into which intake air is introduced is provided with an intake air temperature sensor as well, and the value of the intake air amount detected via the intake air amount sensor is corrected on the basis of the temperature of the intake air detected by the intake air temperature sensor, so as to conform to the actual volume of the intake air. Therefore, in order to obtain proper air-fuel ratio, the temperature of the intake air needs to be accurately detected by the intake air temperature sensor.

The intake air temperature sensor, however, can possibly deteriorate in detection characteristic due to time-dependent changes. Furthermore, the intake air temperature sensor may have a fault that is caused by a break, a shortcircuit or the like in the electrical system of the sensor. At any rate, such an abnormality of the intake air temperature sensor can become a cause of the internal combustion engine failing to obtain a proper air-fuel ratio, and therefore the presence/absence of such an abnormality needs to be diagnosed with high reliability. Therefore, early diagnosis of the presence/absence of an abnormality of the intake air temperature sensor is pursued by introducing a diagnostic device as disclosed in, for example, Japanese Patent Application Publication No. JP-A-10-61479. The diagnostic device described in Japanese Patent Application Publication No. JP-A-10-61479 diagnoses the presence/absence of an abnormality of the intake air temperature sensor on the assumption that when the vehicle is at a stop with the engine being in a fully warmed-up state, the intake air temperature detected via the intake air temperature sensor should be a correspondingly high temperature.

By executing the diagnosis of the intake air temperature sensor in this manner, the reliability of the detection of the intake air temperature can be kept high at the time of the air-fuel ratio control as well. Even if the presence of an abnormality is diagnosed, a safety run of the vehicle to a safety place or the like can be carried out on the basis of a predetermined appropriate fail-safe process. However, from the standpoint of early diagnosis with the air-fuel ratio control and the like taken into consideration, it is desirable that the diagnosis be performed at the time point when the internal combustion engine is started up even though the engine is under a cold condition or the like. In this respect, if the fully warmed-up state of the internal combustion engine is awaited before the diagnosis is executed as in the diagnostic device described in Japanese Patent Application Publication No. JP-A-10-61479, it is difficult to determine whether the engine control, in particular, the air-fuel ratio control or the like, has been properly performed during the wait.

Aside from the desirable construction in which the diagnosis is performed at the time point when the internal combustion engine is started up, the temperature in the engine compartment of the vehicle can become considerably high during the stop of the engine following the previous trip, due to the effect of sun shine or the like for example, in the case where the vehicle is parked in the sun for a long time. In that case, the temperature of the internal combustion engine, in particular, of the intake pipe where the intake air temperature sensor is mounted, can rise considerably high. That is, if the diagnosis of the intake air temperature sensor is executed under such a situation, proper diagnosis of the presence/absence of an abnormality of the intake air temperature cannot necessarily be made through the temperature information detected via the sensor.

SUMMARY OF THE INVENTION

It is an object of the invention to provide an abnormality diagnostic device for an intake air temperature sensor for an internal combustion engine which is capable of diagnosing the presence/absence of an abnormality of the intake air temperature sensor early and properly regardless of a vehicle environment prior to the startup of the internal combustion engine, or the like.

An abnormality diagnostic device for an intake air temperature sensor for an internal combustion engine according to a first aspect of the invention diagnoses presence/absence of abnormality of the intake air temperature sensor that detects a temperature of an air taken into an intake pipe of the internal combustion engine that is mounted in a vehicle. The abnormality diagnostic device for the intake air temperature sensor for the internal combustion engine compares a lowest temperature of an intake air detected via the intake air temperature sensor in a period from a startup of the internal combustion engine until a trend of change in the temperature of the air taken into the internal combustion engine becomes stable with a detected temperature provided via a second temperature sensor that is provided in the vehicle and that detects a temperature that serves as an index of the change in the temperature of the intake air, and the abnormality diagnostic device diagnoses the presence/absence of abnormality of the intake air temperature sensor based on a magnitude of deviation between the lowest temperature detected via the intake air temperature sensor and the detected temperature provided via the second temperature sensor.

Provided that the intake air temperature sensor is normal there usually occurs a change or difference between the intake air temperatures detected before and after the intake of air starts at the time of start up of the internal combustion engine, because of the corresponding absence and presence of heat exchange. Therefore, it becomes possible to perform the diagnosis regarding the intake air temperature sensor based on the monitoring of the aforementioned temperature change, at a very early time, that is, at the time of startup of the internal combustion engine. Even though the intake air temperature sensor is normal, the fashion of the change in the intake air temperature usually varies depending on the vehicular environments prior to the startup of the internal combustion engine, for example, the presence/absence of sun shine or the degree thereof during the stop of the vehicle, or the like.

Therefore, according to the first aspect of the invention, a detected temperature provided via the second temperature sensor that is provided in the vehicle and that detects a temperature that serves as an index of the change in the temperature of the intake air and the lowest temperature of the intake air detected via the intake air temperature are compared, and on the basis of the magnitude of deviation between the temperatures, the presence/absence of abnormality of the intake air temperature sensor is diagnosed. Hence, a more proper diagnosis of abnormality regarding the intake air temperature sensor in which the differences in the effects of the vehicular environments prior to the startup of the internal combustion engine are absorbed or mitigated is realized. Furthermore, the lowest temperature of the intake air detected via the intake air temperature sensor is a value in which the aforementioned temperature change due to the heat exchange is most conspicuously reflected, and the use of the lowest temperature more easily realizes the abnormality diagnosis of the intake air temperature with high sensitivity. Incidentally, as the temperature that serves as an index of the change in the temperature of the intake air, it is possible to adopt a temperature that is not significantly affected by differences in the vehicular environments prior to the startup of the internal combustion engine, or a temperature in which differences in the vehicular environments prior to the startup of the internal combustion engine are directly reflected, etc. Regardless of which one of the temperatures is adopted, the abnormality diagnosis of the intake air temperature sensor can be properly accomplished if the magnitude of deviation from the change in the temperature of the intake air is empirically grasped, and, for example, criterion values corresponding to the magnitudes of deviations are determined beforehand. As for the period required for the aforementioned detection, that is, the period from the startup of the internal combustion engine until the trend of change in the temperature of the air taken into the internal combustion engine becomes stable, a period (amount of time) of, for example, about 15 seconds, following the startup of the internal combustion engine suffices, even with the effect of sun shine and the like being taken into account.

In the first aspect, the abnormality diagnostic device may compare the lowest temperature detected via the intake air temperature sensor with the detected temperature provided via the second temperature sensor that is occurring at a time point when the temperature of the intake air reaches the lowest temperature in the period.

According to this construction, regardless of whether the second temperature that is subjected to the comparison is the temperature that is not significantly affected by differences in the vehicular environments prior to the startup of the internal combustion engine, or the temperature in which differences in the vehicular environments prior to the startup of the internal combustion engine are directly reflected, the use of measurement values provided at the same time point makes it possible to detect abnormality of the intake air temperature sensor with high reliability, In the first aspect, the abnormality diagnostic device may compare the lowest temperature detected via the intake air temperature sensor with the detected temperature provided via the second temperature sensor that is occurring at a time point when the internal combustion engine is started up.

In the foregoing aspect, the second temperature sensor may be a water temperature sensor that detects the temperature of cooling water of the internal combustion engine, and if the comparison shows that the lowest temperature of the intake air detected via the intake air temperature sensor is deviated from the temperature detected via the water temperature sensor by at least a predetermined amount, the abnormality diagnostic device may diagnose that the intake air temperature sensor is abnormal.

According to the foregoing aspect, the intake air temperature and the cooling water temperature both gradually rise with operation of the internal combustion engine after the internal combustion engine is started up. Therefore, the deviation between the temperatures detected via the two sensors is small provided that the intake air temperature sensor is normal. Therefore, usually, the intake air temperature sensor can be diagnosed as being abnormal if the temperature detected via the intake air temperature sensor and the temperature detected via the water temperature sensor greatly deviate from each other. However, in the case where there is certain effect of environments outside the vehicle, such as sun shine or the like, the intake air temperature generally rises faster than the water temperature due to the difference in specific heat between water and air, so that the deviation therebetween becomes great. In the foregoing construction, however, since the lowest temperature of the intake air detected via the intake air temperature sensor and the temperature detected via the water temperature sensor are compared, the effect of vehicular environments can be minimized, and incorrect diagnosis of the intake air temperature sensor can be restrained.

In the foregoing aspect, the second temperature sensor may be an external air temperature sensor that detects an external air temperature outside the vehicle, and if the comparison shows that a deviation between the lowest temperature of the intake air detected via the intake air temperature sensor and the external air temperature detected via the external air temperature sensor is smaller than a predetermined value, the abnormality diagnostic device may diagnose that the intake air temperature sensor is abnormal.

In particular, during the cold condition of the internal combustion engine, there is not a great deviation between the temperature of the air in the intake pipe and the temperature of external air. Besides, for example, when there is effect of sun shine or the like as mentioned above, the air in the intake pipe and the external air both rise in temperature due to such effect. Therefore, the temperatures are unlikely to greatly deviate from each other. However, after the internal combustion engine is started up, the inflow of external air into the intake pipe causes heat exchange so that the temperature of the intake air in the intake pipe declines while the external air temperature does not substantially change. Therefore, after the internal combustion engine is started up, these detected temperatures deviate from each other provided that the intake air temperature sensor is normal. Therefore, as in the foregoing aspect, on the basis of an excessively small magnitude of the deviation between the temperature detected via the external air temperature sensor and the lowest temperature detected via the intake air temperature sensor within the aforementioned period, it can be diagnosed that the intake air temperature sensor is abnormal. Thus, the abnormality diagnosis regarding the intake air temperature sensor can be precisely executed.

An abnormality diagnostic device for an intake air temperature sensor for an internal combustion engine according to a second aspect of the invention diagnoses presence/absence of abnormality of the intake air temperature sensor that detects a temperature of an air taken into an intake pipe of the internal combustion engine that is mounted in a vehicle. The abnormality diagnostic device for the internal combustion engine-purpose intake air temperature sensor compares an average temperature of an intake air detected via the intake air temperature sensor in a period from a startup of the internal combustion engine until a trend of change in the temperature of the air taken into the internal combustion engine becomes stable with a detected temperature provided via a second temperature sensor that is provided in the vehicle and that detects a temperature that serves as an index of the change in the temperature of the intake air, and the abnormality diagnostic device diagnoses the presence/absence of abnormality of the intake air temperature sensor based on a magnitude of deviation between the average temperature detected via the intake air temperature sensor and the detected temperature provided via the second temperature sensor.

Provided that the intake air temperature sensor is normal, there usually occurs a change or difference between the intake air temperatures detected before and after the intake of air starts at the time of start up of the internal combustion engine, because of the corresponding absence and presence of heat exchange. Therefore, it becomes possible to perform the diagnosis regarding the intake air temperature sensor based on the monitoring of the aforementioned temperature change, at a very early time, that is, at the time of startup of the internal combustion engine. Even though the intake air temperature sensor is normal, the fashion of the change in the intake air temperature usually varies depending on the vehicular environments prior to the startup of the internal combustion engine, for example, the presence/absence of sun shine or the degree thereof during the stop of the vehicle, or the like. Therefore, according to the second aspect of the invention, a detected temperature provided via the second temperature sensor that is provided in the vehicle and that detects a temperature that serves as an index of the change in the temperature of the intake air and the average temperature of the intake air detected via the intake air temperature are compared, and on the basis of the magnitude of deviation between the temperatures, the presence/absence of abnormality of the intake air temperature sensor is diagnosed. Hence, a more proper diagnosis of abnormality regarding the intake air temperature sensor in which the differences in the effects of the vehicular environments prior to the startup of the internal combustion engine are absorbed or mitigated is realized. Furthermore, since the average temperature of the intake air detected via the intake air temperature sensor within the aforementioned period is adopted, the abnormality diagnosis with high sensitivity in which the effects caused by external disturbance, such as so-called noise or the like, are mitigated can be realized. Incidentally, as the temperature that serves as an index of the change in the temperature of the intake air, it is possible to adopt a temperature that is not significantly affected by differences in the vehicular environments prior to the startup of the internal combustion engine, or a temperature in which differences in the vehicular environments prior to the startup of the internal combustion engine are directly reflected, etc. Regardless of which one of the temperatures is adopted, the abnormality diagnosis of the intake air temperature sensor can be properly accomplished if the magnitude of deviation from the change in the temperature of the intake air is empirically grasped, and, for example, criterion values corresponding to the magnitudes of deviations are determined beforehand. As for the period required for the aforementioned detection, that is, the period from the startup of the internal combustion engine until the trend of change in the temperature of the air taken into the internal combustion engine becomes stable, a period (amount of time) of, for example, about 15 seconds, following the startup of the internal combustion engine suffices, even with the effect of sun shine and the like being taken into account.

In the foregoing aspect, the abnormality diagnostic device may compare the average temperature detected via the intake air temperature sensor with the detected temperature provided via the second temperature sensor that is an average temperature obtained in the period.

In the case where the average value of the detected temperatures provided via the intake air temperature sensor is adopted, adoption of an average value calculated within the same period as the detected temperature provided the second temperature sensor will enable the comparison under the same condition, so that abnormality of the intake air temperature sensor can be detected with even higher reliability.

In the foregoing aspect, the abnormality diagnostic device may compare the average temperature detected via the intake air temperature sensor with the detected temperature provided via the second temperature sensor that is occurring at a time point when the internal combustion engine is started up.

In the foregoing aspect, the second temperature sensor may be a water temperature sensor that detects the temperature of cooling water of the internal combustion engine, and if the comparison shows that the average temperature of the intake air detected via the intake air temperature sensor is deviated from the temperature detected via the water temperature sensor by at least a predetermined amount, the abnormality diagnostic device may diagnose that the intake air temperature sensor is abnormal.

Therefore, the intake air temperature sensor can be diagnosed as being abnormal if the temperature detected via the intake air temperature sensor and the temperature detected via the water temperature sensor greatly deviate from each other, as mentioned above. However, in the case where there is certain effect of environments outside the vehicle, such as sun shine or the like, the intake air temperature generally rises faster than the water temperature due to the difference in specific heat between water and air, so that the deviation therebetween becomes great. In the foregoing construction, however, due to the adoption of the average temperature of the intake air detected via the intake air temperature sensor within the aforementioned period, including the period during which the temperature of the intake air declines due to heat exchange, it is possible to restrain the effect caused by the rise in the intake air temperature resulting from the effect of the environment outside the vehicle, and therefore it is also possible to restrain incorrect diagnosis of the intake air temperature sensor. Besides, if the average value within the aforementioned period is adopted with regard to the temperature of cooling water detected via the water temperature sensor, the accuracy of the diagnosis can be further improved.

In the foregoing aspect, the abnormality diagnostic device may further include a time measurement portion that measures a time during which the internal combustion engine is at a stop. If at a time of the startup of the internal combustion engine, the time measured immediately previously by the time measurement portion is in a time zone during which there is a possibility that the warmed-up state of the internal combustion engine remains, the abnormality diagnostic device may suspend execution of diagnosis.

However, for example, in the case where the operation of the internal combustion engine is re-started within a short time following the stopping of the internal combustion engine, the detection of temperature by the aforementioned sensors is performed in a state where the temperature raised by the previous engine operation has not sufficiently declined but the warmed-up state of the internal combustion engine remains. If the abnormality diagnosis of the intake air temperature sensor is executed during this state, it is highly likely that the state of the internal combustion engine at the time of detection of temperature is different from the state of the internal combustion engine pre-assumed for the time of startup of the internal combustion engine, and therefore there is a possibility of an incorrect diagnosis being made. According to the above-described construction, however, such an incorrect diagnosis can be avoided since the execution of the abnormality diagnosis is suspended until it is confirmed that a time sufficient for the warmed-up state of the internal combustion engine to disappear has elapsed following the stopping of the internal combustion engine.

In the foregoing aspect, the abnormality diagnostic device may suspend execution of diagnosis if a cooling water temperature at a time of the startup of the internal combustion engine which is detected by a water temperature sensor that detects the temperature of cooling water of the internal combustion engine indicates that a warmed-up state of the internal combustion engine remains.

As described above, if the detection of temperature via the sensors is performed at the time of startup of the internal combustion engine when the warmed-up state of the internal combustion engine remains, there is a possibility that the presence/absence of abnormality of the intake air temperature sensor may be incorrectly diagnosed. The presence/absence of the warmed-up state of the internal combustion engine can also be determined from the detected temperature provided via the water temperature sensor. Furthermore, the detected temperature provided via the water temperature sensor can be said to be more direct. According to the foregoing construction, the incorrect diagnosis can be avoided also by measuring the cooling water temperature at the time of startup of the internal combustion engine, and determining whether or not the internal combustion engine is in the warmed-up state, and suspending the execution of the abnormality diagnosis on the basis of a result of the determination.

In the foregoing aspect, the abnormality diagnostic device may suspend execution of diagnosis if a temperature decline of the intake air detected via the intake air temperature sensor in the period is greater than or equal to a predetermined amount.

In the case where the rise in the intake pipe temperature caused by the effect of sun shine or the like is great, it sometimes happens that during the period required till stabilization of the trend of change in the temperature of intake air, the intake pipe temperature does not decline to such a level as to eliminate the need to take into account the effect of sun shine or the like. In such a case, the intake air temperature detected via the intake air temperature sensor is naturally high, so that the deviation between the intake air temperature and the temperature detected via the second temperature sensor sometimes becomes different from the deviation assumed at the time of the startup of the internal combustion engine. That is, there is a possibility that the intake air temperature sensor may be incorrectly diagnosed as being abnormal even though the intake air temperature sensor is actually normal. According to the above-described construction, however, such an incorrect diagnosis can be avoided since the execution of the abnormality diagnosis is suspended in the case where the temperature decline from the intake air temperature occurring at the time of startup of the internal combustion engine is greater than a predetermined value, for example, in the case where the rise in the intake pipe temperature due to the effect of sun shine or the like is greater than an assumed range.

An abnormality diagnostic method for an intake air temperature sensor for an internal combustion engine according to a third aspect of the invention diagnoses presence/absence of abnormality of the intake air temperature sensor that detects a temperature of an air taken into an intake pipe of the internal combustion engine that is mounted in a vehicle. In the abnormality diagnostic method, a lowest temperature of an intake air detected via the intake air temperature sensor in a period from a startup of the internal combustion engine until a trend of change in the temperature of the air taken into the internal combustion engine becomes stable is compared with a detected temperature provided via a second temperature sensor that is provided in the vehicle and that detects a temperature that serves as an index of the change in the temperature of the intake air, and the presence/absence of abnormality of the intake air temperature sensor is diagnosed based on a magnitude of deviation between the lowest temperature detected via the intake air temperature sensor and the detected temperature provided via the second temperature sensor.

An abnormality diagnostic method for an intake air temperature sensor for an internal combustion engine according to a fourth aspect of the invention diagnoses presence/absence of abnormality of the intake air temperature sensor that detects a temperature of an air taken into an intake pipe of the internal combustion engine that is mounted in a vehicle. In the abnormality diagnostic method, an average temperature of an intake air detected via the intake air temperature sensor in a period from a startup of the internal combustion engine until a trend of change in the temperature of the air taken into the internal combustion engine becomes stable is compared with a detected temperature provided via a second temperature sensor that is provided in the vehicle and that detects a temperature that serves as an index of the change in the temperature of the intake air, and the presence/absence of abnormality of the intake air temperature sensor is diagnosed based on a magnitude of deviation between the average temperature detected via the intake air temperature sensor and the detected temperature provided via the second temperature sensor.

BRIEF DESCRIPTION OF TEE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
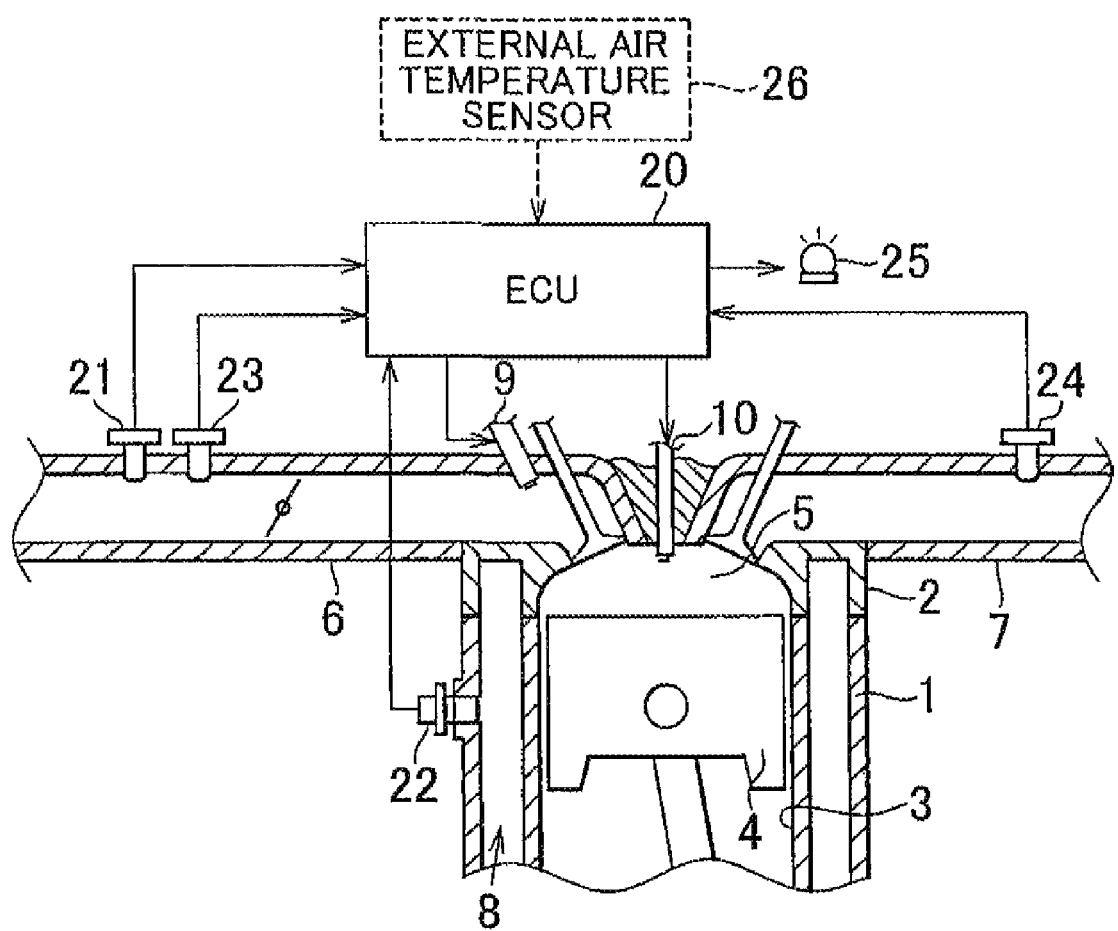
FIG. 1 is a schematic diagram showing a construction of an internal combustion engine that is a main object of the application of a first embodiment of an abnormality diagnostic device for an internal combustion engine-purpose intake air temperature sensor.

A first embodiment of the invention will be described hereinafter with reference to FIGS. 1 to 4. FIG. 1 is a schematic illustration of a construction of an internal combustion engine and a control device thereof that are mounted in a vehicle. The control device of the internal combustion engine includes an abnormality diagnostic device for an intake air temperature sensor for the internal combustion engine in accordance with this embodiment.

As shown in FIG. 1, the internal combustion engine includes a cylinder block 1 and a cylinder head 2. In a cylinder 3 formed in the cylinder block 1, a piston 4 is placed so as to be reciprocated. Furthermore in the cylinder 3, a combustion chamber 5 is defined by an inner peripheral surface of the cylinder 3, a top surface of the piston 4, and a portion of the cylinder head 2. An intake pipe 6 and an exhaust pipe 7 are connected to the cylinder head 2. A cooling water jacket 8 is provided extending from the cylinder block 1 to the cylinder head 2. In the intake pipe 6, an injector 9 that is a fuel injection valve is provided near an intake port that faces the combustion chamber 5, and an ignition plug 10 is provided in a portion of the cylinder head 2 which faces the combustion chamber 5. Specifically, in the internal combustion engine, the fuel injected through the injector 9 mixes with the air taken into the intake pipe 6, that is, the intake air, and the thus-formed mixture is compressed in the combustion chamber 5 and is spark-ignited by the ignition plug 10. Thus, combustion occurs. Then, through the movements of the piston 4 caused by the combustion, the power of the engine is provided.

Next, the control device of the internal combustion engine will be described. As the control device of the internal combustion engine, an electronic control device (ECU) 20 is provided for performing various controls, including the fuel injection control accompanying an air-fuel ratio control, an ignition timing control, etc.

Sensors and the like as mentioned below are connected to an input circuit of the electronic control device 20. For example, an intake air temperature sensor 21 is attached to the intake pipe 6. The intake air temperature sensor 21 detects the intake air temperature IAT from the temperature of the air (intake air) that flows within the intake pipe 6 fixed to the cylinder head 2, and outputs the value of the intake air temperature IAT to the electronic control device 20. A water temperature sensor 22 is provided on the cooling water jacket 8. The water temperature sensor 22 detects the cooling water temperature ECT from the temperature of the cooling water that flows in the cooling water jacket 8, and outputs the value of the detected cooling water temperature ECT to the electronic control device 20. Furthermore, the intake pipe 6 is provided with an air flow meter 23 that detects the amount of intake air that flows within the intake pipe 6. Still further, the exhaust pipe 7 is provided with an air-fuel ratio sensor 24 that detects the air-fuel ratio of the mixture subjected to the combustion from the exhaust gas discharged into the exhaust pipe 7.

An alarm lamp 25 is connected to an output circuit of the electronic control device 20. The alarm lamp 25 is turned on if it is diagnosed that the intake air temperature sensor 21 is abnormal through the abnormality diagnosis in accordance with this embodiment. In an ordinary construction, the alarm lamp 25 is provided in an instrument panel that is provided at the driver's seat side in the motor vehicle.

Next, a content of control that the electronic control device 20 performs will be described. In order to make proper the exhaust characteristic in various states of operation of the internal combustion engine, the electronic control device 20 controls the air-fuel ratio of the air-fuel mixture on the basis of the control of the amount of fuel injected through the injector 9. Specifically, at the time of this control, the electronic control device 20 calculates the amount of fuel injection (more precisely, the open valve duration of the injector 9) on the basis of the intake air amount detected by the air flow meter 23. More specifically, on the basis of the air-fuel ratio (oxygen concentration) detected by the air-fuel ratio sensor 24, the electronic control device 20 feedback-corrects the amount of every fuel injection through the injector 9 so as to achieve a stoichiometric air-fuel ratio that allows maintenance of maximum performance of exhaust purification by a catalytic converter (not shown). However, although the intake air amount is always detected via the air flow meter 23, the intake air changes in density in accordance with the temperature thereof. Therefore, the intake air amount detected in this manner does not always equal the actual volume of intake air. Therefore, on the basis of the intake air temperature IAT detected by the intake air temperature sensor 21, the electronic control device 20 corrects the value of intake air amount detected by the air flow meter 23 so that the value conforms to the actual volume of intake air.

However, as described above, the intake air temperature sensor 21 can possibly deteriorate in detection characteristic due to time-dependent changes, and may have a fault that is caused by a break, a shortcircuit or the like in the electrical system of the intake air temperature sensor 21. If the intake air temperature sensor 21 has such an abnormality, what happens then is that a change in the actual intake air temperature does not cause a change in the detected intake air temperature IAT, or that the degree of change in the intake air temperature IAT is slower than the degree of change in the actual intake air temperature, or the like. Therefore, if the measured value of intake air amount is corrected on the basis of such an incorrect value of intake air temperature IAT, the post-correction value does not equal the actual volume of intake air, so that the air-fuel ratio control cannot be appropriately performed. To overcome this drawback, the electronic control device 20 diagnoses the presence/absence of such an abnormality of the intake air temperature sensor 21 and, if it is diagnosed that the intake air temperature sensor 21 is abnormal, the electronic control device 20 turns on the alarm lamp 25 so as to alert an occupant of the vehicle.

Figure 2:
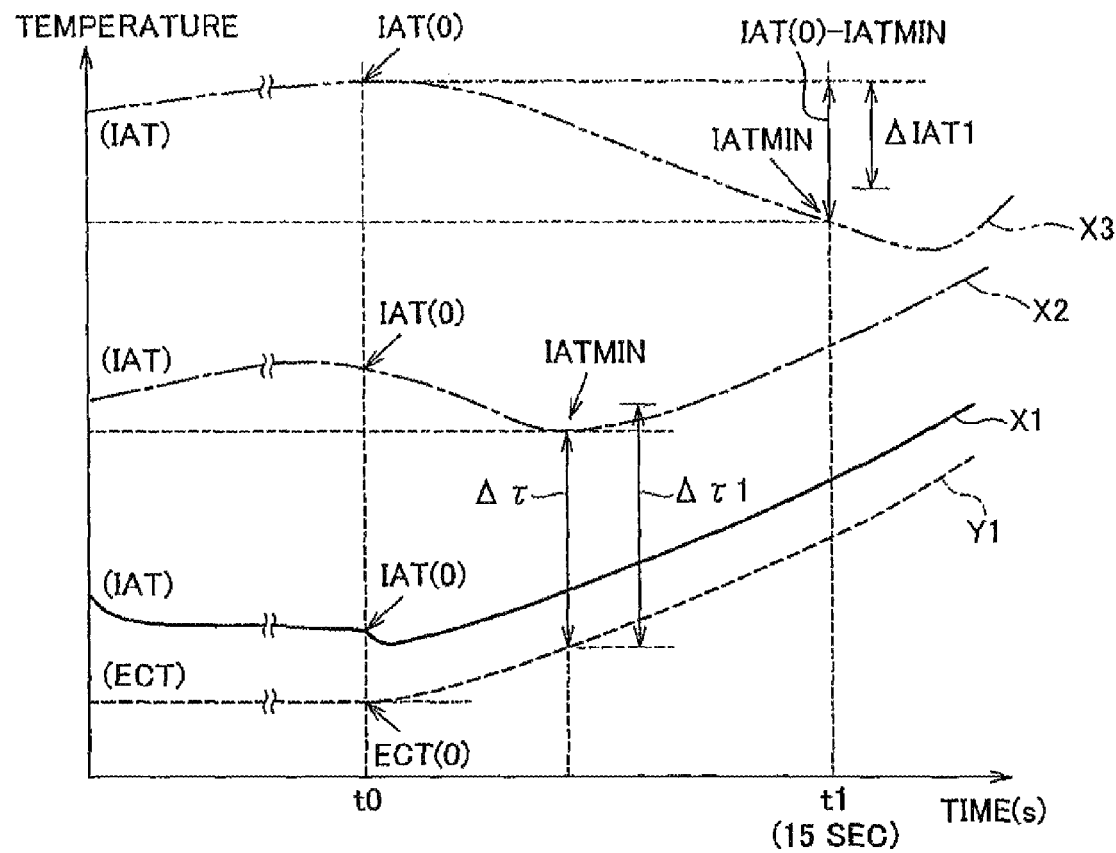
FIG. 2 is a graph showing an example of the transitions of the intake air temperature and the cooling water temperature with the elapse of time following startup of the engine in the first embodiment of the invention.

Hereinafter, an overall content of the abnormality diagnosis of the intake air temperature sensor 21 that the electronic control device 20 performs will be described with reference to FIG. 2. FIG. 2 is a graph showing fashions of the changes in the intake air temperature IAT and the cooling water temperature ECT which occur as time elapses.

For example, if during cold engine condition, the internal combustion engine is started up at a time t0 as shown by a solid line X1 in FIG. 2, external air is taken into the intake pipe 6, and the taken-in air (intake air) undergoes heat exchange in the intake pipe 6. Therefore, as long as the intake air temperature sensor 21 is normal, the intake air temperature IAT detected via the intake air temperature sensor 21 accordingly declines on a temporary basis. Then, after the internal combustion engine reaches self-sustained operation, the detected intake air temperature IAT gradually rises with the operation of the internal combustion engine. In the meantime, as shown by a dashed line Y1 in FIG. 2, the cooling water temperature ECT detected via the water temperature sensor 22 gradually rises with the operation of the internal combustion engine once the engine has reached the self-sustained operation. Incidentally, the intake air temperature IAT and the cooling water temperature ECT, after stabilization of the trend of change in those temperatures, continue to gradually rise to certain temperatures in substantially the same trend, and usually do not greatly deviate from each other. Therefore, if attention is focused on the relationship between the intake air temperature IAT and the cooling water temperature ECT during a period from the startup of the engine till the stabilization of the trend of change of those temperatures, for example, the period from the time t0 to a time t1, the presence/absence of an abnormality can be diagnosed on the basis of whether or not the deviation between the two temperatures becomes greater than a predetermined criterion value.

However, in the case where, as shown by a one-dot chain line X2 in FIG. 2, the intake air temperature IAT detected when the engine is started is slightly high due to, for example, the effect of sun shine, the deviation between the intake air temperature IAT and the cooling water temperature ECT when the engine is started becomes large. Therefore, if the abnormality diagnosis of the intake air temperature sensor 21 is executed in the above-described fashion with the time to, that is, the engine startup time, being considered as a reference time point, there is a possibility that even though the intake air temperature sensor 21 is normal, the deviation of the detected temperature may become large leading to an incorrect diagnosis that the intake air temperature sensor 21 is abnormal. Hence, in this embodiment, the intake air temperature IAT used for the comparison in the magnitude of the deviation is a lowest intake air temperature IATMIN that is the lowest value of the temperature that is detected during the period until the trend of change of the temperature becomes stable, that is, the period from the time t0 to the time t1 in this embodiment. This lowest intake air temperature IATMIN is a value on which the change in temperature due to the aforementioned heat exchange in the intake pipe 6 is most conspicuously reflected while the effect of sun shine or the like is relatively small, and is a value in which the differences in the effects of the vehicular environments due to the effect of sun shine or the like prior to the startup of the engine are mitigated. Therefore, the abnormality diagnosis of the intake air temperature sensor 21 can also be properly accomplished by setting a criterion value $\Delta\tau1$ as shown in FIG. 2, and determining whether or not the deviation between the two temperatures ($\Delta\tau$) is less than or equal to the criterion value $\Delta\tau1$.

Furthermore, in the case where, as shown by a two-dot chain line X3 in FIG. 2, the intake air temperature IAT detected at the time t0 when the engine is started is very high due to great effect of sun shine or the like, the deviation ($\Delta\tau$) between the lowest intake air temperature IATMIN and the corresponding cooling water temperature ECT may sometimes become greater than the criterion value $\Delta\tau1$ regardless of whether the intake air temperature sensor 21 is normal or abnormal. Therefore, in such a case, it is desirable to suspend the execution of the abnormality diagnosis. This will avoid an incorrect diagnosis that occurs because the deviation between the intake air temperature IAT and the corresponding cooling water temperature ECT is different from the deviation assumed at the time of startup of the engine.

Figure 3:
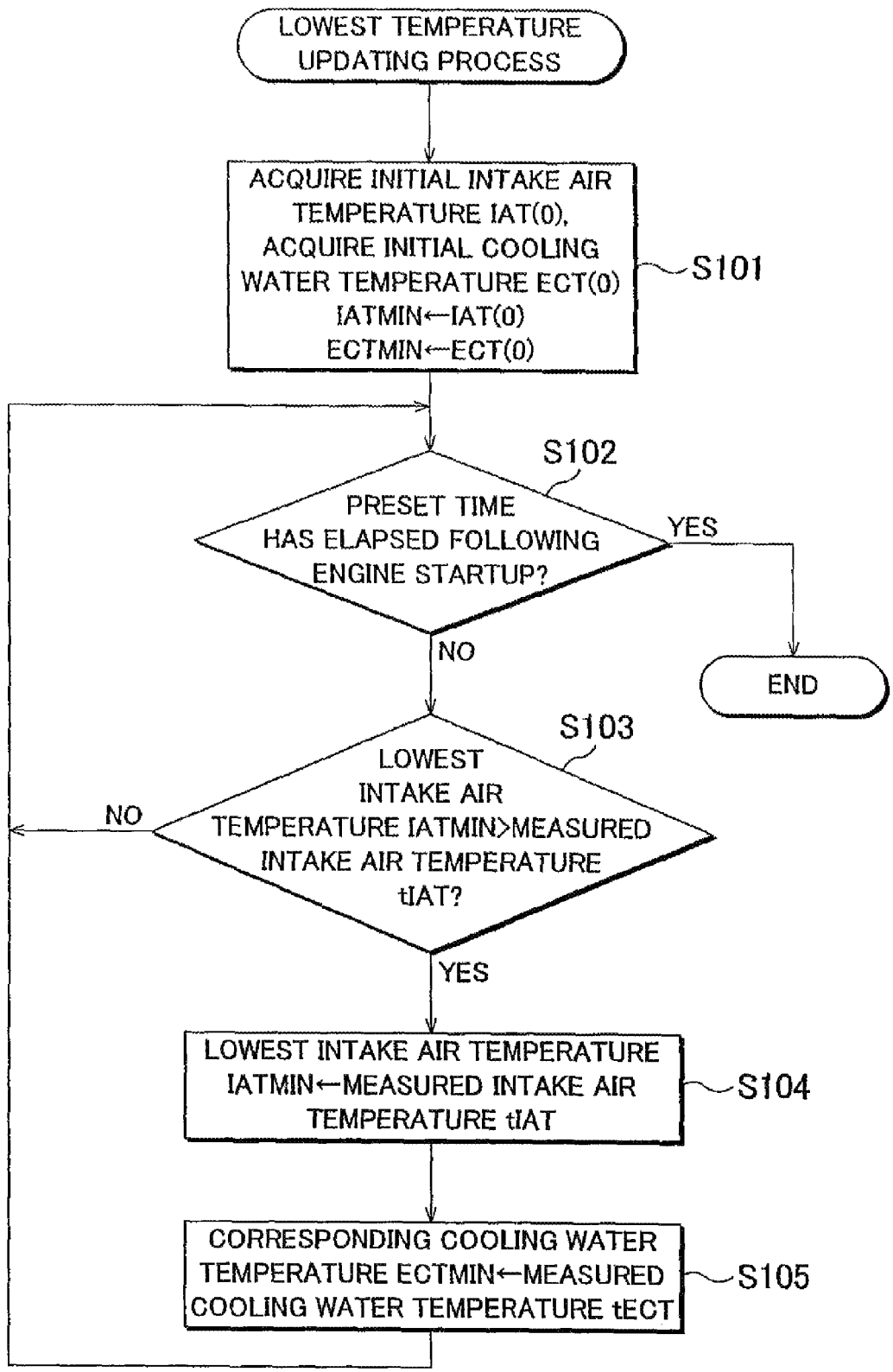
FIG. 3 is a flowchart showing a processing procedure related to the update of the lowest temperature of the intake air detected via an intake air temperature sensor in the first embodiment of the invention.
Figure 4:
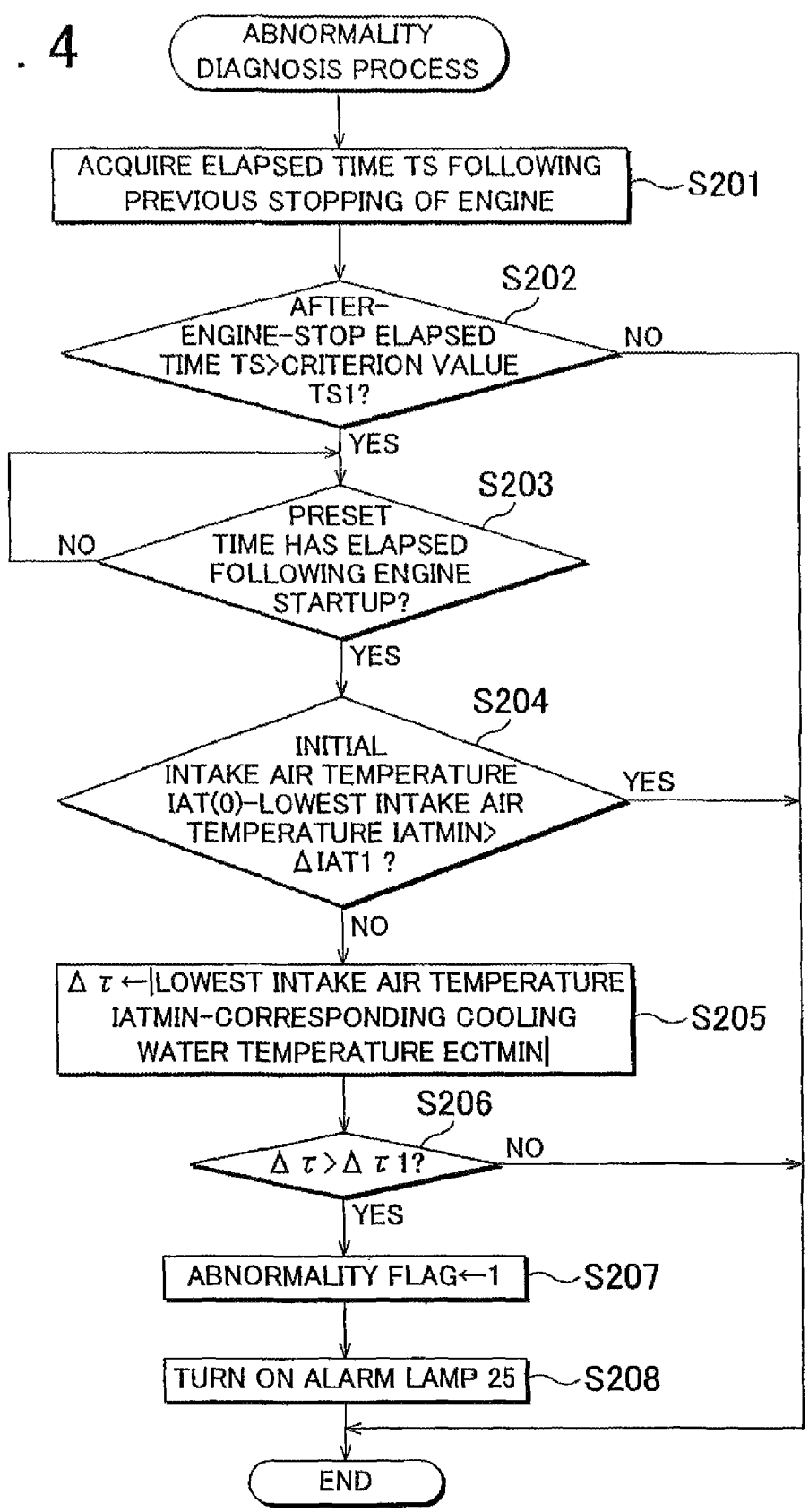
FIG. 4 is a flowchart showing a concrete processing procedure related to the abnormality diagnosis of the intake air temperature sensor in the first embodiment of the invention.

A flow of a series of processes performed by the electronic control device 20 related to the abnormality diagnosis of the intake air temperature sensor 21 described above, that is, by an abnormality diagnostic device, will be described with reference to FIGS. 3 and 4. FIG. 3 is a flowchart showing a process of updating the lowest temperature of the detected intake air temperature IAT. FIG. 4 is a flowchart showing a process related to the abnormality diagnosis of the intake air temperature sensor 21 that is performed after the process shown in FIG. 3.

The lowest temperature updating process is started upon the turning-on operation of the ignition switch, and is executed repeatedly at predetermined time intervals by a timer interrupt processing. That is, when the ignition switch is turned on, the electronic control device 20 first performs a process of initializing various values as shown in FIG. 3, specifically, acquires and stores an initial intake air temperature IAT (0) and an initial cooling water temperature ECT (0) occurring when the engine is started. Furthermore, the electronic control device 20 substitutes the value of the acquired initial intake air temperature IAT (0) to a lowest intake air temperature IATMIN, and also substitutes the value of the acquired initial cooling water temperature ECT (0) to a corresponding cooling water temperature ECTMIN (step S101). Incidentally, the initialization process of step S101 is executed only in the first run of the lowest temperature updating process after the startup of the engine, and in the timer interrupt processing that follow, the lowest temperature updating process starts with the process of step S102.

Subsequently, the electronic control device 20 determines whether or not a predetermined time has elapsed following the startup of the engine (step S102). This predetermined time is a time that has been calculated as an amount of time that is required from the startup of the engine until the trend of change in the intake air temperature becomes stable. It has been confirmed that it suffices that the aforementioned time be a period (amount of time) of, for example, about 15 seconds, following the startup of the internal combustion engine, that is, the amount of time of the time t0 to the time t1 shown in FIG. 2, even with the effect of sun shine and the like being taken into account. Then, if an negative determination is made (NO) in step S102, the electronic control device 20 proceeds to step S103, in which the electronic control device 20 determines whether or not a measured intake air temperature tIAT detected at that time point by the intake air temperature sensor 21 is lower than the currently stored lowest intake air temperature IATMIN. If a negative determination is made (NO) in step S103, the electronic control device 20 avoids updating the value of the lowest intake air temperature IATMIN, and in the next run of the timer interrupt processing, executes the process starting in step S102 again.

On the other hand, if an affirmative determination is made (YES) in step S103, the electronic control device 20 proceeds to step S104, in which the electronic control device 20 updates the value of the lowest intake air temperature IATMIN to the current value of the measured intake air temperature tIAT. With regard to the value of the corresponding cooling water temperature ECTMIN, the electronic control device 20 makes an update to the value of the measured cooling water temperature tECT detected by the water temperature sensor 22 at the same time point as the acquisition of the measured intake air temperature tIAT (step S105). After that, the electronic control device 20 repeatedly executes the process starting at step S102, and ends the execution of the process at the time point of elapse of the aforementioned predetermined time ("YES" in step S102) following the startup of the engine.

Furthermore, the electronic control device 20, using the thus-updated value of the lowest intake air temperature IATMIN, executes the abnormality diagnosis of the intake air temperature sensor 21. The process related to the abnormality diagnosis is also started upon the turning-on of the ignition switch, and is repeatedly executed at predetermined time intervals by a timer interrupt processing.

That is, as shown in FIG. 4, when this diagnostic process starts, the electronic control device 20 first acquires the elapsed time TS following the previous stopping of the engine in step S201. The elapsed time TS may be obtained by using time measurement information from a timer device, for example, a soak timer or the like, that is usually provided in the electronic control device 20. Subsequently, the electronic control device 20 determines whether or not the acquired elapsed time TS is greater than a criterion value TS1 (step S202). Ordinarily, when the engine is stopped after reaching a warmed-up state, the temperature of the engine gradually declines. However, for example, in the case where the internal combustion engine is re-started within a short time following the stopping of the engine, the detection of temperature by the aforementioned sensors is performed in a state where the temperature raised by the previous engine operation has not sufficiently declined but the warmed-up state of the engine remains. If the abnormality diagnosis of the intake air temperature sensor 21 is executed during this state, it is highly likely that the state of the engine at the time of detection of temperature is different from the state of the engine pre-assumed for the time of startup of the engine, and therefore there is a possibility of an incorrect diagnosis being made. In this embodiment, therefore, in such a case, the process related to the abnormality diagnosis is held from being executed. Incidentally, the foregoing criterion value TS1 for the elapsed time TS is set at a time that is required until the temperature of the internal combustion engine having been in the warmed-up state becomes equal to the temperature of external air, for example, set at a value of "7 hours". Then, if a negative determination is made (NO) in step S202, the electronic control device 20 suspends the abnormality diagnosis of the intake air temperature sensor 21, that is, avoids execution of the diagnosis, and then ends the process.

On the other hand, if an affirmative determination is made (YES) in step S202, the electronic control device 20 waits for the elapse of a predetermined time following the startup of the engine, that is, a time (e.g., 15 seconds) that corresponds to the amount of time of the time t0 to the time t1 shown as an example in FIG. 2 (step S203). Until the predetermined time elapses, the electronic control device 20 is executing the lowest temperature updating process, and the lowest intake air temperature has not been established. Then, when an affirmative determination is made (YES) in step S203, that is, when the elapse of the aforementioned predetermined time is verified, the electronic control device 20 proceeds to step S204. In step S204, the electronic control device 20 determines whether or not the value of the established lowest intake air temperature IATMIN is lower than the initial intake air temperature IAT (0) by more than a predetermined criterion value $\Delta$IAT1. Specifically, as shown by a two-dot chain line X3 in FIG. 2, in the case where the temperature rise of the intake pipe 6 caused by the effect of sun shine or the like is great, it sometimes happens that during the period required till stabilization of the trend of change in the temperature of intake air, that is, a period of about 15 seconds following the startup of the engine, the temperature of the intake pipe 6 does not decline to such a level as to eliminate the need to take into account the effect of sun shine or the like. In such a case, the deviation between the lowest intake air temperature IATMIN and the corresponding cooling water temperature ECTMIN during this period becomes excessively large, thus leading to the possibility that the intake air temperature sensor 21 will be diagnosed as being abnormal although the intake air temperature sensor 21 is actually normal. Therefore, in this embodiment, if an affirmative determination is made (YES) in step S204, that is, the effect of sun shine or the like is large, the electronic control device 20 suspends the execution of the abnormality diagnosis, and ends the process.

On the other hand, if a negative determination is made (NO) in step S204, the electronic control device 20 proceeds to step S205, in which the electronic control device 20 calculates a difference $\Delta\tau$ between the established lowest intake air temperature IATMIN and the corresponding cooling water temperature ECTMIN. Then, the electronic control device 20 determines in step S206 whether or not the value $\Delta\tau$ calculated in step S205 is greater than a criterion value $\Delta\tau$1 set for diagnosing the presence/absence of an abnormality of the intake air temperature sensor 21. In this case, since the intake air temperature IAT is not substantially affected by sun shine, for example, as shown by the solid line X1 in FIG. 2, the intake air temperature IAT temporarily declines due to the heat exchange at the time of startup of the engine, and then gradually rises with the operation of the engine provided that the intake air temperature sensor 21 is normal. In this case, the difference $\Delta\tau$ between the lowest intake air temperature IATMIN on the solid line X1 and the corresponding cooling water temperature ECTMIN on the dashed line Y1 is definitely smaller than the criterion value $\Delta\tau$1, so that it is diagnosed that the intake air temperature sensor 21 is normal. Then, the diagnostic process is ended. In the case of the intake air temperature IAT shown by the one-dot chain line X2 in FIG. 2, the temperature is already slightly raised prior to the startup of the engine, due to the effect of sun shine or the like. Therefore, at the time of startup of the engine, the deviation between the intake air temperature IAT and the cooling water temperature ECT is already great. However, in this case, the intake air temperature IAT detected after the engine is started up also temporarily declines due to the heat exchange provided that the intake air temperature sensor 21 is normal. Therefore, the difference $\Delta\tau$ between the lowest intake air temperature IATMIN on the one-dot chain line X2 and the corresponding cooling water temperature ECTMIN on the dashed line Y1 is also smaller than the criterion value $\Delta\tau$1. Therefore, in this case, too, it is diagnosed that the intake air temperature sensor 21 is normal, and the diagnostic process is ended. However, if due to an abnormality of one kind or another of the intake air temperature sensor 21, the detected intake air temperature IAT has no change despite a change in the actual intake air temperature, or the degree of change in the detected intake air temperature IAT is slower than the degree of change in the actual intake air temperature, then the temperature difference $\Delta\tau$ sometimes exceeds the criterion value $\Delta\tau$1 particularly under an environment shown as an example by the one-dot chain line X2. In this case, in the diagnostic process, an affirmative determination (YES) is made in step S206 in the determination process of step S206. That is, the electronic control device 20 diagnoses that the intake air temperature sensor 21 is abnormal, and sets the value of an abnormality flag at "1" (step S207), and turns on the alarm lamp 25 so as to inform an occupant (driver) of the abnormality (step S208). In addition, due to the setting of the value of the abnormality flag to "1", a suitable fail-safe process for usual safety run of the vehicle to a safe place or the like is executed as well.

The operation and effects of the foregoing embodiment will be described below.

(1) The presence/absence of an abnormality of the intake air temperature sensor 21 is diagnosed on the basis of the magnitude of the deviation between the cooling water temperature ECT and the lowest intake air temperature IATMIN detected by the intake air temperature sensor 21 within a period (e.g., 15 seconds) from the startup of the internal combustion engine until the trend of change in the temperature of the air taken into the engine becomes stable. Provided that the intake air temperature sensor 21 is normal, there usually occurs a change or difference between the intake air temperatures IAT detected before and after the intake of air starts at the time of start up of the internal combustion engine, because of the corresponding absence and presence of heat exchange. Therefore, the adoption of this fashion of diagnosis makes it possible to diagnose the intake air temperature sensor 21 at a very early time, that is, at the time of startup of the engine. Furthermore, the cooling water temperature ECT and the lowest intake air temperature IATMIN are compared, and the magnitude of the deviation between the two temperatures is used as a basis for determining the presence/absence of an abnormality of the intake air temperature sensor 21. This allows realization of a more proper abnormality diagnosis regarding the intake air temperature sensor 21 in which the differences in the effects of the vehicular environments prior to the startup of the engine due to sun shine or the like are mitigated. Incidentally, the lowest intake air temperature IATMIN is a value in which the temperature change caused by the foregoing heat exchange is most conspicuously reflected, and the use of the value makes it possible to realize the abnormality diagnosis of the intake air temperature sensor 21 with increased ease and increased sensitivity.

(2) The intake air temperature IAT and the cooling water temperature ECT are compared. If the deviation between the two temperatures compared is greater than the predetermined criterion value $\Delta\tau 1$, it is diagnosed that the intake air temperature sensor 21 is abnormal. After the engine is started up, both the intake air temperature and the cooling water temperature gradually rises with the operation of the engine. Therefore, provided that the intake air temperature sensor 21 is normal, the deviation between the two temperatures detected by the respective sensors is small. Therefore, ordinarily, the presence of an abnormality of the intake air temperature sensor 21 can be diagnosed on the basis of a fact that the intake air temperature IAT and the cooling water temperature ECT are greatly deviated from each other. However, in the case where there is an effect of the aforementioned environment outside the vehicle, such as sun shine or the like, the intake air temperature generally rises more quickly than the water temperature so that the deviation thereof becomes large, due to the difference in specific heat between water and air. In this respect, since the lowest intake air temperature IATMIN of the intake air temperature IAT is compared with the cooling water temperature ECT, the effect of the vehicular environment can be minimized, and therefore the incorrect diagnosis of the intake air temperature sensor 21 can be restrained.

(3) The lowest intake air temperature IATMIN is compared with the corresponding cooling water temperature ECTMIN that is a temperature detected by the water temperature sensor 22 at the time point when the intake air temperature IAT reaches the lowest temperature. Since the values measured at the same time point are used in the comparison between the temperatures detected by the sensors 21, 22 for the abnormality diagnosis, it is possible to detect an abnormality of the intake air temperature sensor 21 with high reliability.

(4) The electronic control device 20 measures the length of time during which the internal combustion engine is at a stop, as an elapsed time TS. If the elapsed time TS measured immediately before the engine is started up is within a time zone during which there is a possibility of the warmed-up state remaining in the engine. For example, in the case where the internal combustion engine is restarted within a short time following the stopping of the engine, the detection of temperatures via the sensors 21, 22 is performed while the warmed-up state of the engine remains. If with this state remaining, the above-described abnormality diagnosis regarding the intake air temperature sensor 21 is executed, the state of engine at the time of detection of the temperature is highly likely to be different from the state of engine assumed beforehand for the time of startup of the engine, and therefore there is a possibility of an incorrect diagnosis being made. In this embodiment, however, such an incorrect diagnosis can be avoided since the execution of the abnormality diagnosis is suspended until it is confirmed that a time sufficient for the warmed-up state of the engine to disappear has elapsed following the stopping of the engine.

(5) The execution of the abnormality diagnosis of the intake air temperature sensor 21 is suspended also when the decline in the temperature of the intake air detected by the intake air temperature sensor 21 during a period from the startup of the engine until the trend of change in the temperature of the air taken into the engine is greater than or equal to the criterion value IAT1. If the rise in temperature inside the intake pipe 6 is great due to the effect of sun shine or the like, it can happen that the temperature in the intake pipe 6 does not decline to such a level as to eliminate the need to take into account the effect of sun shine or the like, within the period from the startup of the engine until the trend of change in the temperature of the air taken in becomes stable. In such a case, the temperature detected by the intake air temperature sensor 21 is naturally high, so that the deviation between the intake air temperature and the temperature detected by the water temperature sensor 22 sometimes becomes different from the deviation assumed beforehand for the startup of the engine. That is, there is a possibility that the intake air temperature sensor 21 may be incorrectly diagnosed as being abnormal even though the intake air temperature sensor 21 is actually normal. In this embodiment, however, such an incorrect diagnosis can be avoided since the execution of the abnormality diagnosis is also suspended in the case where the temperature decline from the initial intake air temperature IAT (0) is greater than a predetermined value, for example, in the case where the temperature rise inside the intake pipe 6 due to the effect of sun shine or the like is greater than an assumed range.

Next, a second embodiment of the invention will be described with reference to FIGS. 5 and 6.

The second embodiment is different from the first embodiment in that the electronic control device 20 performs the abnormality diagnosis of the intake air temperature sensor 21 by comparing an average temperature of the intake air detected via the intake air temperature sensor 21 and an average temperature of cooling water detected via the water temperature sensor 22. The abnormality diagnosis process in the second embodiment will be described mainly with respect to differences from the first embodiment.

Figure 5:
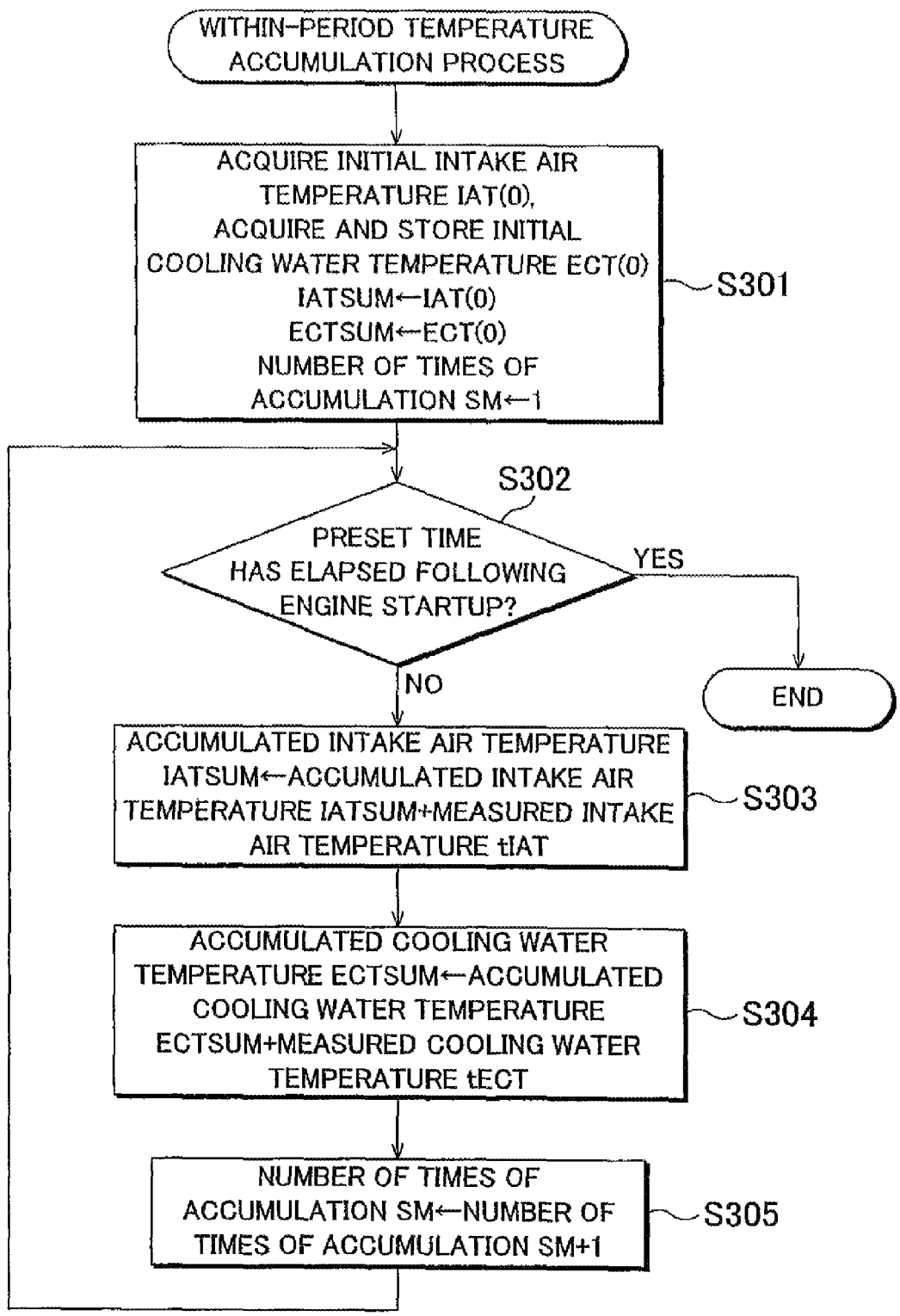
FIG. 5 is a flowchart showing a processing procedure related to the update of the average temperature of the intake air detected via the intake air temperature sensor in a second embodiment of the invention.

FIG. 5 is a flowchart showing a process of accumulating the temperatures of the intake air and the cooling water detected within a predetermined period following the startup of the engine, that is, a within-period temperature accumulation process. FIG. 6 is a flowchart showing a series of processes related to the abnormality diagnosis of the intake air temperature sensor 21 that follows the process shown in FIG. 5. Basically, these processes are also executed repeatedly at predetermined time intervals by a timer interrupt processing.

As the within-period temperature accumulation process shown in FIG. 5, the electronic control device 20 first acquires and stores an initial intake air temperature IAT (0) and an initial cooling water temperature ECT (0) detected at the time of startup of the engine as value initialization processes. Furthermore, the electronic control device 20 also substitutes the value of the acquired initial intake air temperature IAT (0) to an intake air temperature cumulative value IATSUM, and substitutes the value of the acquired initial cooling water temperature ECT (0) to a cooling water temperature cumulative value ECTSUM, and initializes the value of the number of times of accumulation SM by substituting "1" thereto (step S301). After that, the electronic control device 20 monitors the elapse of a predetermined time (e.g., 15 seconds in this embodiment) following the startup of the engine as in the foregoing embodiment (step S302). Until the predetermined time elapses, the electronic control device 20 calculates the intake air temperature cumulative value IATSUM by accumulating or successively adding the measured intake air temperature tIAT detected every time the within-period temperature accumulation process is executed (step S303). Furthermore, the electronic control device 20 also calculates the cooling water temperature cumulative value ECTSUM by accumulating or successively adding the measured cooling water temperature tECT detected every time the within-period temperature accumulation process is executed (step S304). Then, the electronic control device 20 increments the value of the number of times of accumulation SM by "1" every time the within-period temperature accumulation process is executed (step S305). Then, at the time point when the predetermined time elapses (YES in step S302), the electronic control device 20 ends the process.

Figure 6:
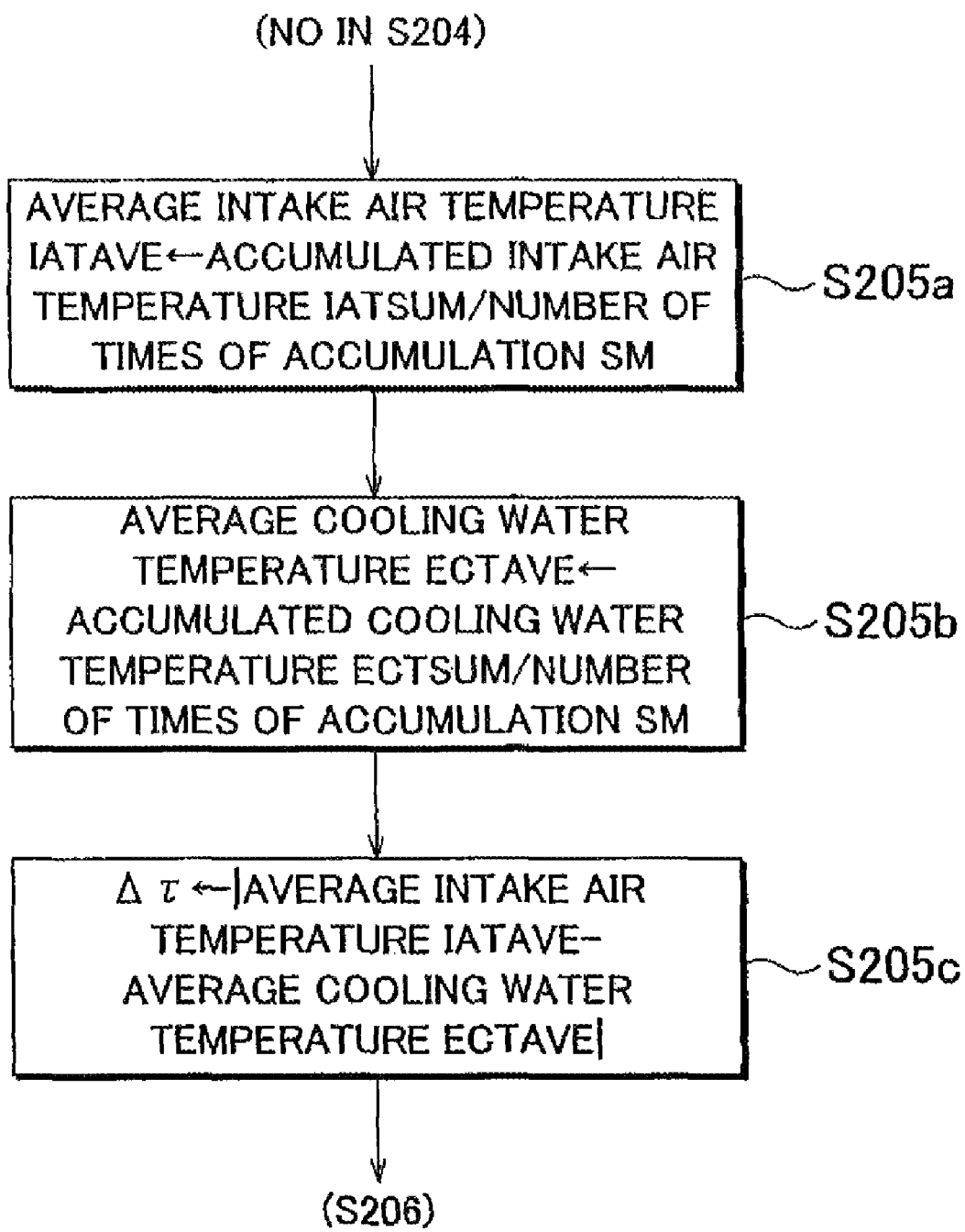
FIG. 6 is a flowchart showing a concrete processing procedure related to the abnormality diagnosis of the intake air temperature sensor in the second embodiment of the invention.

In the abnormality diagnosis in the second embodiment, the electronic control device 20 executes the process shown in FIG. 6 in place of the process of step S205 in the abnormality diagnosis process shown in FIG. 4. That is, the electronic control device 20, after executing step S204 in FIG. 4, calculates an intake air temperature average value IATAVE by dividing the intake air temperature cumulative value IATSUM found as described above by the number of times of accumulation SM found as described above (step S205a). Likewise, the electronic control device 20 calculates a cooling water temperature average value ECTAVE by dividing the cooling water temperature cumulative value ECTSUM found as described above by the number of times of accumulation SM found as described above (step S205b). After that, the electronic control device 20 calculates a difference Δτ between the intake air temperature average value IATAVE and the cooling water temperature average value ECTAVE (step S205c), and executes the comparison based on the value Δτ in step S206 in FIG. 4 to diagnose the presence/absence of an abnormality of the intake air temperature sensor 21. Other processes in this abnormality diagnosis process are the same as those in FIG. 4 described above in conjunction with the first embodiment.

The above-described second embodiment achieves the following operation and effects in addition to the effects similar to the effects (4) and (5) of the first embodiment.

(6) The intake air temperature average value IATAVE detected via the intake air temperature sensor 21 within the period from the startup of the internal combustion engine until the trend of change in the temperature of the air taken into the engine becomes stable, and the cooling water temperature average value ECTAVE detected via the water temperature sensor 22 within the same period are compared. Due to the adoption of the intake air temperature average value IATAVE detected via the intake air temperature sensor 21 within the aforementioned period, including the period during which the intake air declines in temperature due to heat exchange, it becomes possible to realize an abnormality diagnosis in which the stability is further heightened with reduced effect of external disturbances, such as so-called noise or the like, while the effect caused by the rise in the intake air temperature resulting from the effect of the environment outside the vehicle is restrained. Besides, in the case where the intake air temperature average value IATAVE is adopted as described above, the adoption of the cooling water temperature average value ECTAVE calculated within the same period, with regard to the cooling water temperature ECT, allows the comparison under the same condition. Hence, it is possible to diagnose the presence/absence of an abnormality of the intake air temperature sensor 21 with high reliability.

Incidentally, instead of the cooling water temperature average value ECTAVE, the cooling water temperature ECT may also be used for the comparison with the intake air temperature average value IATAVE, so that the presence/absence of an abnormality of the intake air temperature sensor 21 can be diagnosed on the basis of the magnitude of the deviation between the temperatures compared.

Figure 8:
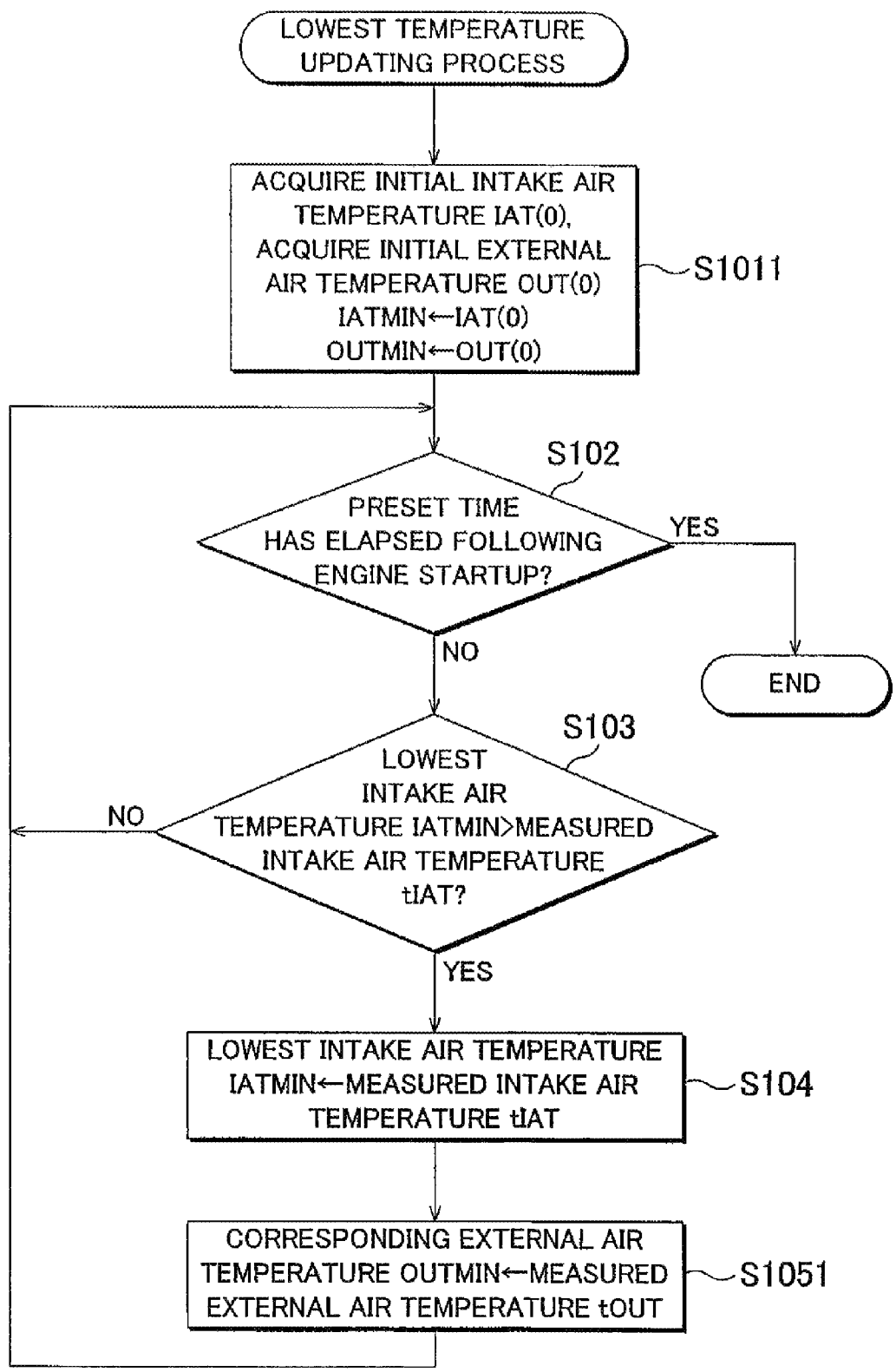
FIG. 8 is a flowchart showing a processing procedure related to the update of the lowest temperature of the intake air in the third embodiment of the invention.
Figure 9:
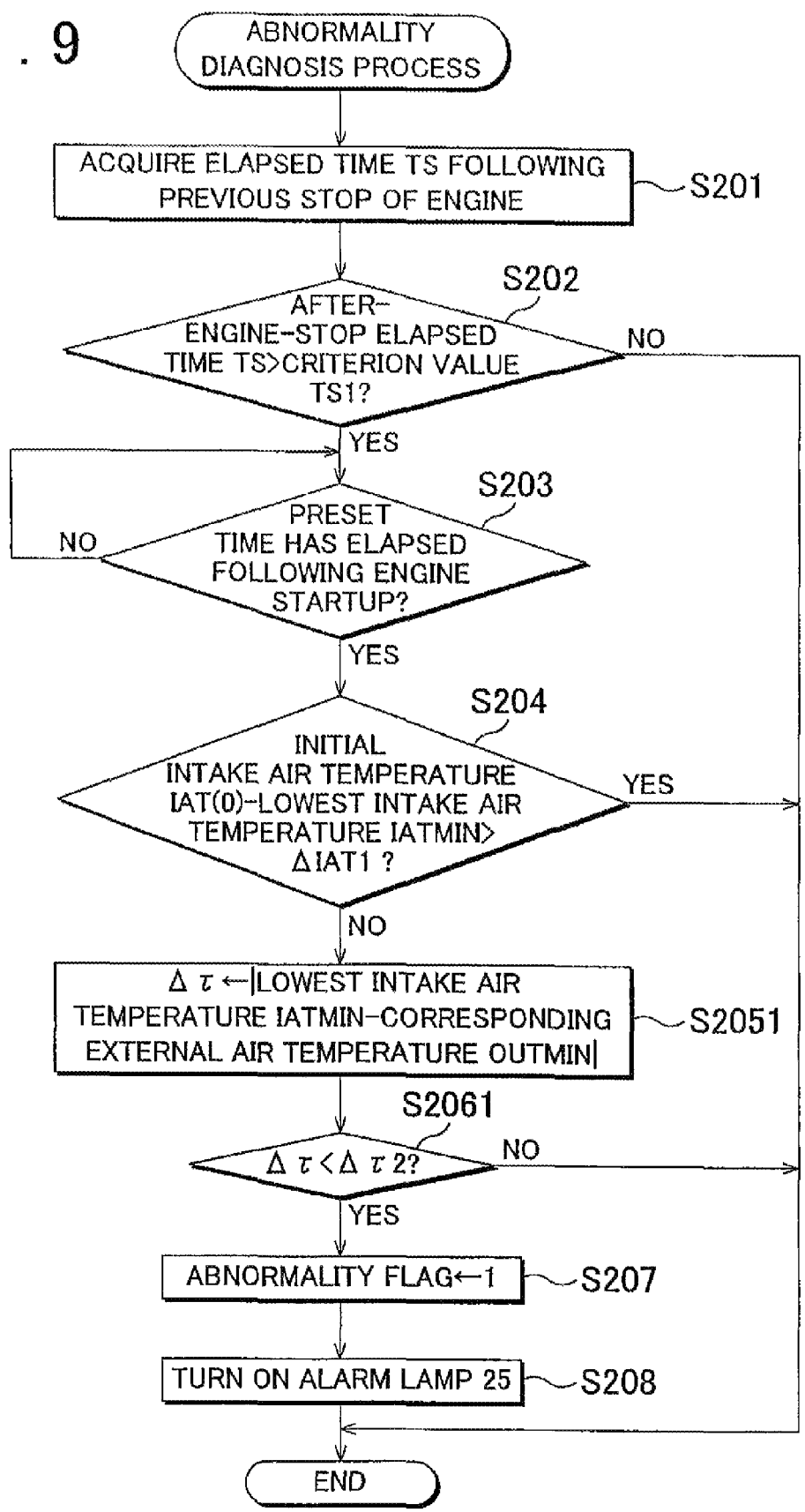
FIG. 9 is a flowchart showing a concrete processing procedure related to the abnormality diagnosis of the intake air temperature sensor in the third embodiment of the invention.

Next, a third embodiment of the invention will be described with reference to FIGS. 7 to 9. The third embodiment is different from the first or second embodiment in that the electronic control device 20 executes the abnormality diagnosis by comparing an intake air temperature IAT detected via the intake air temperature sensor 21 and an external air temperature OUT detected via an external air temperature sensor 26 shown by a dashed line in FIG. 1. The external air temperature sensor 26 is a sensor that is provided outside the engine compartment in which the internal combustion engine is mounted, for example, in the vicinity of a bumper or the like of the vehicle.

Figure 7:
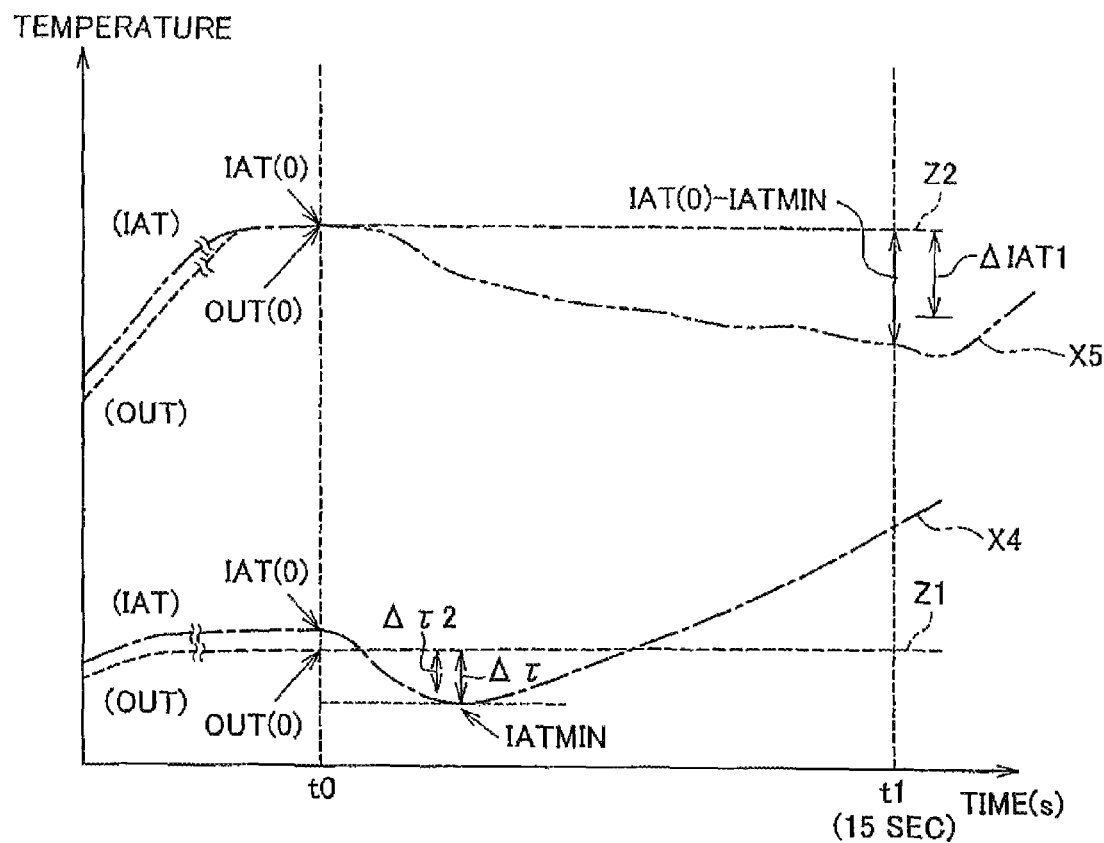
FIG. 7 is a graph showing an example of the transitions of the intake air temperature and the external air temperature following startup of the engine in a third embodiment of the invention.

FIG. 7 shows an example of transitions of the intake air temperature IAT and the external air temperature OUT with the elapse of time. In FIG. 7, of the transitions of the intake air temperature IAT detected by the intake air temperature sensor 21, the transition in the case where the effect of sun shine or the like is small is shown by a one-dot chain line X4, and the transition in the case where the effect of sun shine or the like is large is shown by a two-dot chain line X5. Furthermore, of the transitions of the external air temperature OUT detected by the external air temperature sensor 26, the transition in the case where the effect of sun shine or the like is small is shown by a dashed line Z1, and the transition in the case where the effect of sun shine or the like is large is shown by a dashed line Z2.

As shown in FIG. 7, at a time to when the internal combustion engine is started up in a cold condition, there is not a great deviation between the intake air temperature TAT of the air within the intake pipe 6 and the external air temperature OUT. Ordinarily, the intake air temperature TAT rises or falls following the temperature of the external air before the engine is started up. Therefore, it is less likely that there is a great deviation between the external air temperature OUT and the intake air temperature IAT regardless of the presence/absence of the effect of sun shine or the like. After the internal combustion engine is started up, however, the inflow of external air into the intake pipe 6 causes heat exchange, so that the intake air temperature IAT of the intake air in the intake pipe 6 declines while the external air temperature OUT does not substantially change. Therefore, after the engine is started up, these detected temperatures deviate from each other provided that the intake air temperature sensor 21 is normal. Therefore, on the basis of an excessively small magnitude of the deviation between the temperature detected via the external air temperature sensor 26 and the lowest temperature detected via the intake air temperature sensor 21 within the aforementioned period from the startup of the engine until the trend of change in the temperature of the air taken into the engine becomes stable, it can be diagnosed that the intake air temperature sensor 21 is abnormal.

A flow of a concrete process of the abnormality diagnosis as described above will be described below with reference to FIGS. 8 and 9. FIG. 8 is a flowchart showing a process of updating the lowest temperature of the detected intake air temperature TAT, basically similar to FIG. 3. FIG. 9 is a flowchart showing an abnormality diagnosis process of the intake air temperature sensor 21, basically similar to FIG. 4.

The abnormality diagnosis in this embodiment is different from the abnormality diagnosis in the foregoing first embodiment merely in a process described below. That is, as shown in FIGS. 8 and 9, in this embodiment, from a lowest temperature IATMIN of the intake air detected via the intake air temperature sensor 21 and a corresponding external air temperature OUTMIN detected by the external air temperature sensor 26 at the same time point of detection of the lowest temperature IATMIN, a difference Δτ therebetween is calculated. Then, as shown in FIG. 9, the electronic control device 20 determines whether or not the difference Δτ calculated from the values of the lowest intake air temperature IATMIN and the corresponding external air temperature OUTMIN (step S2051) is smaller than a criterion value Δτ2 set for diagnosing the presence/absence of an abnormality of the intake air temperature sensor 21 (step S2061). Then, if an affirmative determination is made (YES) in step S2061, the electronic control device 20 diagnoses that the intake air temperature sensor 21 is abnormal.

The foregoing third embodiment achieves the following operation and effects in addition to the effects (4) and (5) of the first embodiment.

(7) It is diagnosed that the intake air temperature sensor 21 is abnormal, if the deviation between the lowest intake air temperature IATMIN and the external air temperature OUT is smaller than the predetermined value. Before the engine is started up, there is not a great deviation between the temperature of the intake air and the temperature of the external air. After the engine is started up, the inflow of external air into the intake pipe 6 causes heat exchange, so that the temperature of the intake air in the intake pipe 6 declines while the temperature of the external air substantially does not change. Therefore, on the basis of a fact that the magnitude of the deviation between the lowest intake air temperature IATMIN and the temperature detected via the external air temperature sensor 26 is small, it can be precisely diagnosed that the intake air temperature sensor 21 is abnormal.

Incidentally, the first to third embodiments may also be carried out with modifications as described below.

Although the construction in which the abnormality diagnosis is suspended if the effect of the vehicular environment, such as sun shine or the like, is great at the time of startup of the engine, it is also permissible to adopt a construction in which such suspension is omitted particularly in the case where the temperature detected via the intake air temperature sensor 21 and the temperature detected via the external air temperature sensor 26 are compared as in the third embodiment. In such a case, since the fashion of deviation between the temperatures detected at the time of startup of the engine substantially does not vary regardless of the presence/absence or the magnitude of the aforementioned effect of the environment or the like, the abnormality diagnosis can be executed without an error.

It is also possible to adopt a construction in which only when the intake air temperature sensor 21 is diagnosed as being abnormal and "1" is substituted to the value of the abnormality flag, execution of the abnormality diagnosis from then on is prevented on the basis of the value of the abnormality flag.

Instead of the construction in which the determination as to whether or not the warmed-up state of the engine remains when the engine is started up is performed on the basis of the elapsed time TS from the stopping of the previous engine operation till the present startup of the engine, it is possible to adopt a construction in which the determination is performed directly from the cooling water temperature that is detected by the water temperature sensor 22 at the time of startup of the engine. In this construction, it can be directly grasped whether or not the engine is in the warmed-up state.

Although in the foregoing embodiments the lowest intake air detected via the intake air temperature sensor 21 is compared with the second temperature that is detected at the same time point, the second temperature detected at a different time point may instead be used. For example, the comparison with the temperature detected at the time of startup of the engine also allows abnormality diagnosis similar to the foregoing abnormality diagnosis.

Although in the foregoing embodiments the average intake air detected via the intake air temperature sensor 21 is compared with the average value of the second temperature detected within the same period, the second temperature obtained at a different time point may instead be used. For example, the comparison with the second temperature detected at the time of startup of the engine also allows abnormality diagnosis similar to the foregoing abnormality diagnosis.

Although the period from the startup of the engine until the trend of change in the temperature of the air taken into the engine becomes stable is set as, for example, a period of 15 seconds, this period may be suitably changed in accordance with the characteristic of output of the engine at the time of startup or the like.

Although the criterion value Δτ1 for determining whether or not the intake air temperature sensor 21 is abnormal is a fixed value in the foregoing embodiments, the criterion value Δτ1 may also be a value that is corrected on the basis of various variables that indicate the state of the engine or the like.

The invention claimed is:

1. An abnormality diagnostic device for an intake air temperature sensor that detects a temperature of an air taken into an intake pipe of an internal combustion engine that is mounted in a vehicle, comprising:
    a second temperature sensor that is provided in the vehicle and that detects a temperature that serves as an index of a change in the temperature of an intake air; and
    a control device that compares a lowest temperature of the intake air detected via the intake air temperature sensor in a period from a startup of the internal combustion engine until a trend of the change in the temperature of the air taken into the internal combustion engine becomes stable with a detected temperature provided via the second temperature sensor, and that diagnoses presence/absence of abnormality of the intake air temperature sensor based on a magnitude of deviation between the lowest temperature detected via the intake air temperature sensor and the detected temperature provided via the second temperature sensor.

2. The abnormality diagnostic device according to claim 1, wherein the control device compares the lowest temperature detected via the intake air temperature sensor with the detected temperature provided via the second temperature sensor that is occurring at a time point when the temperature of the intake air reaches the lowest temperature in the period.

3. The abnormality diagnostic device according to claim 1, wherein the control device compares the lowest temperature detected via the intake air temperature sensor with the detected temperature provided via the second temperature sensor that is occurring at a time point when the internal combustion engine is started up.

4. The abnormality diagnostic device according to claim 1, wherein the second temperature sensor is an external air temperature sensor that detects an external air temperature outside the vehicle, and if the comparison shows that a deviation between the lowest temperature of the intake air detected via the intake air temperature sensor and the external air temperature detected via the external air temperature sensor is smaller than a predetermined value, the control device diagnoses that the intake air temperature sensor is abnormal.

5. The abnormality diagnostic device according to claim 1, further comprising a time measurement portion that measures a time during which the internal combustion engine is at a stop, wherein if at a time of the startup of the internal combustion engine, the time measured immediately previously by the time measurement portion is in a time zone during which there is a possibility that the warmed-up state of the internal combustion engine remains, the control device suspends execution of diagnosis.

6. The abnormality diagnostic device according to claim 1, wherein the control device suspends execution of diagnosis if a cooling water temperature at a time of the startup of the internal combustion engine which is detected by a water temperature sensor that detects the temperature of cooling water of the internal combustion engine indicates that a warmed-up state of the internal combustion engine remains.

7. The abnormality diagnostic device according to claim 1, wherein the control device suspends execution of diagnosis if a temperature decline of the intake air detected via the intake air temperature sensor in the period is greater than or equal to a predetermined amount.

8. The abnormality diagnostic device according to claim 1, wherein the second temperature sensor is a water temperature sensor that detects the temperature of cooling water of the internal combustion engine, and if the comparison shows that the lowest temperature of the intake air detected via the intake air temperature sensor is deviated from the temperature detected via the water temperature sensor by at least a predetermined amount, the control device diagnoses that the intake air temperature sensor is abnormal.

9. The abnormality diagnostic device according to claim 8, wherein if the temperature of cooling water occurring at a time of the startup of the internal combustion engine which is detected via the water temperature sensor indicates that a warmed-up state of the internal combustion engine remains, the control device suspends execution of diagnosis.

10. An abnormality diagnostic device for an intake air temperature sensor that detects a temperature of an air taken into an intake pipe of an internal combustion engine that is mounted in a vehicle, comprising:
a second temperature sensor that is provided in the vehicle and that detects a temperature that serves as an index of a change in the temperature of an intake air; and
a control device that compares an average temperature of the intake air detected via the intake air temperature sensor in a period from a startup of the internal combustion engine until a trend of the change in the temperature of the air taken into the internal combustion engine becomes stable with a detected temperature provided via the second temperature sensor, and that diagnoses presence/absence of abnormality of the intake air temperature sensor based on a magnitude of deviation between the average temperature detected via the intake air temperature sensor and the detected temperature provided via the second temperature sensor.

11. The abnormality diagnostic device according to claim 10, wherein the control device compares the average temperature detected via the intake air temperature sensor with the detected temperature provided via the second temperature sensor that is an average temperature obtained in the period.

12. The abnormality diagnostic device according to claim 10, wherein the control device compares the average temperature detected via the intake air temperature sensor with the detected temperature provided via the second temperature sensor that is occurring at a time point when the internal combustion engine is started up.

13. The abnormality diagnostic device according to claim 10, further comprising a time measurement portion that measures a time during which the internal combustion engine is at a stop, wherein if at a time of the startup of the internal combustion engine, the time measured immediately previously by the time measurement portion is in a time zone during which there is a possibility that the warmed-up state of the internal combustion engine remains, the control device suspends execution of diagnosis.

14. The abnormality diagnostic device according to claim 10, wherein the control device suspends execution of diagnosis if a cooling water temperature at a time of the startup of the internal combustion engine which is detected by a water temperature sensor that detects the temperature of cooling water of the internal combustion engine indicates that a warmed-up state of the internal combustion engine remains.

15. The abnormality diagnostic device according to claim 10, wherein the control device suspends execution of diagnosis if a temperature decline of the intake air detected via the intake air temperature sensor in the period is greater than or equal to a predetermined amount.

16. The abnormality diagnostic device according to claim 10, wherein the second temperature sensor is a water temperature sensor that detects the temperature of cooling water of the internal combustion engine, and if the comparison shows that the average temperature of the intake air detected via the intake air temperature sensor is deviated from the temperature detected via the water temperature sensor by at least a predetermined amount, the control device diagnoses that the intake air temperature sensor is abnormal.

17. The abnormality diagnostic device according to claim 16, wherein if the temperature of cooling water occurring at a time of the startup of the internal combustion engine which is detected via the water temperature sensor indicates that a warmed-up state of the internal combustion engine remains, the control device suspends execution of diagnosis.

18. An abnormality diagnostic method for an intake air temperature sensor for an internal combustion engine which diagnoses presence/absence of abnormality of the intake air temperature sensor that detects a temperature of an air taken into an intake pipe of the internal combustion engine that is mounted in a vehicle, characterized in that
a lowest temperature of an intake air detected via the intake air temperature sensor in a period from a startup of the internal combustion engine until a trend of change in the temperature of the air taken into the internal combustion engine becomes stable is compared with a detected temperature provided via a second temperature sensor that is provided in the vehicle and that detects a temperature that serves as an index of the change in the temperature of the intake air, and the presence/absence of abnormality of the intake air temperature sensor is diagnosed based on a magnitude of deviation between the lowest temperature detected via the intake air temperature sensor and the detected temperature provided via the second temperature sensor.

19. An abnormality diagnostic method for an intake air temperature sensor for an internal combustion engine which diagnoses presence/absence of abnormality of the intake air temperature sensor that detects a temperature of an air taken into an intake pipe of the internal combustion engine that is mounted in a vehicle, characterized in that an average temperature of an intake air detected via the intake air temperature sensor in a period from a startup of the internal combustion engine until a trend of change in the temperature of the air taken into the internal combustion engine becomes stable is compared with a detected temperature provided via a second temperature sensor that is provided in the vehicle and that detects a temperature that serves as an index of the change in the temperature of the intake air, and the presence/absence of abnormality of the intake air temperature sensor is diagnosed based on a magnitude of deviation between the average temperature detected via the intake air temperature sensor and the detected temperature provided via the second temperature sensor.

* * * * *